United States Patent [19]
Van Huis

[11] 3,768,442
[45] Oct. 30, 1973

[54] MULTI-TIER CAGE CONSTRUCTIONS
[75] Inventor: Robert L. Van Huis, Zeeland, Mich.
[73] Assignee: U.S. Industries, Inc., New York, N.Y.
[22] Filed: Feb. 22, 1972
[21] Appl. No.: 227,793

[52] U.S. Cl.......................... 119/18, 119/22, 119/48
[51] Int. Cl............................................ A01k 31/06
[58] Field of Search........................... 119/18, 22, 48

[56] References Cited
UNITED STATES PATENTS

| 3,192,901 | 7/1965 | Wolff | 119/22 X |
| 3,311,087 | 3/1967 | Graves | 119/18 |
| 2,946,309 | 7/1960 | Page | 119/48 X |
| 3,274,972 | 9/1966 | Keen et al. | 119/18 X |
| 3,492,971 | 2/1970 | Keen et al. | 119/18 |
| 3,274,972 | 9/1966 | Keen et al. | 119/48 |
| 3,478,721 | 11/1969 | Maxfield | 119/18 |
| 3,075,495 | 1/1963 | Stoterau et al. | 119/48 X |
| 3,160,141 | 12/1964 | Crutchfield | 119/22 |
| 2,987,038 | 6/1961 | Cole | 119/48 X |
| 2,309,458 | 1/1943 | Ingraham | 119/22 |
| 2,970,567 | 2/1961 | Rubin | 119/22 |
| 2,448,120 | 8/1948 | Petraske | 119/22 |

FOREIGN PATENTS OR APPLICATIONS

| 1,186,680 | 12/1962 | Germany | 119/48 |
| 966,391 | 8/1964 | Great Britain | 119/48 |
| 946,507 | 1/1964 | Great Britain | 119/22 |

Primary Examiner—Louis G. Mancene
Assistant Examiner—J. A. Oliff
Attorney—Daniel Van Dyke et al.

[57] ABSTRACT

A low profile tri-deck cage assembly having a pair of mutually facing row of cages in each tier is serviceable from a single walk-way adjacent each side of the lower cage level. Each cage profile is reduced by providing a horizontal top panel for each cage which includes openings to permit poultry confined therein to extend their head and neck out so that they can stand upright in the cage. An offset pyramid arrangement of the tiers includes horizontal support members for suspending the cages from the top, at least a portion of which is suspended over a dung-collecting pit. Collecting trays are suspended below the remaining cage portions to prevent droppings from an upper cage into a lower one and a scraper removes the catchings into the pit.

4 Claims, 6 Drawing Figures

PATENTED OCT 30 1973　　　3,768,442

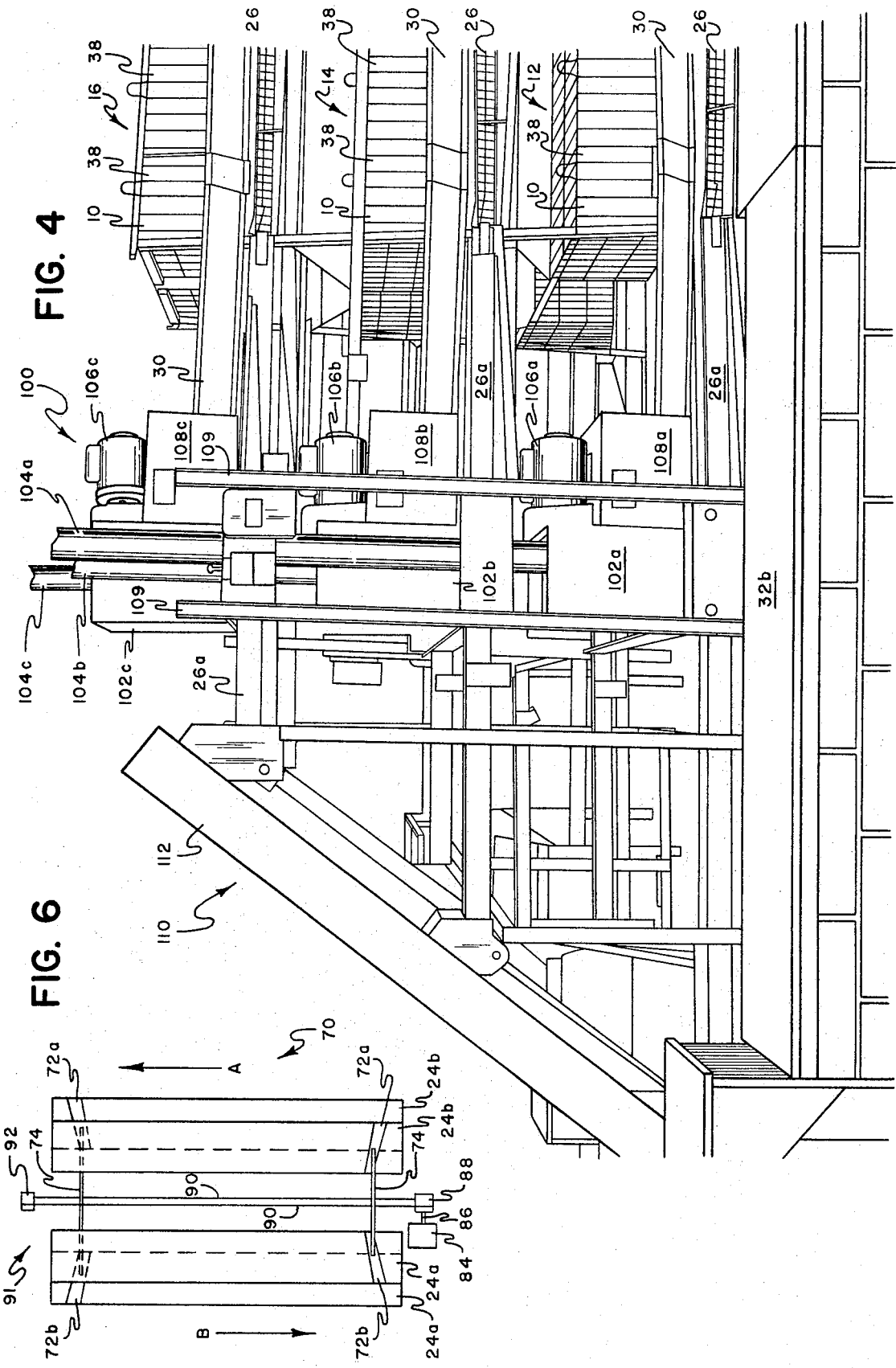

MULTI-TIER CAGE CONSTRUCTIONS

BACKGROUND OF THE INVENTION

This invention relates to a compact low profile multi-deck cage assembly and, more particularly, to a raised tri-deck arrangement which can be serviced by an attendant from one level.

The raising of poultry within confinement cages for egg-production purposes has become the predominating system in this country. A principal reason for this is the many operating advantages and efficiencies realized from cage systems.

With the advent of spiraling costs for building, land, and materials, a constant battle is waged to reduce the amount of material and expense for each confinement cage as well as seek new ways for increasing the number of poultry which can be raised or kept in a given floor space. What appears to be a rather obvious response to this latter inquiry is the stacking of cages in levels one above the other. However, what has not been obvious about such an arrangement is that it does not necessarily reduce overall costs even though the number of poultry confined within a given floor space has been increased. By providing multi-levels of confinement cages watering, feeding, egg collecting, dung-collecting and general servicing of the cages and poultry within the cages becomes increasingly complex resulting in arrangements which increase rather than reduce the overall cost per bird even though a reduction in floor space has been achieved.

Thus, there is a need tosay for a multi-tier arrangement which increases the density of poultry with regards to fllor space while at the same time significantly reduces the overall cost involved per bird. One particular need is an improved tri-deck arrangement which can be completely serviced by an attendant from one level.

SUMMARY OF THE INVENTION

In accordance with the invention the overall profile of a multi-tier cage assembly is reduced significantly by providing a cage construction with a generally horizontal mesh top having openings of substantial size which will permit a mature bird to extend its head and neck out in a fully upright position. The upper tiers of cages are elevated above each other a distance sufficient to permit poultry confined in the lower cages to stand upright. In another aspect, the support frame includes generally horizontal members which suspend the cages adjacent their tops over a dung-collecting surface.

In a more limited aspect of the invention, a tri-deck arrangement with a pyramidal partially off-set tier arrangement significantly reduces the lateral floor space required over single layer arrangements. Each tier includes two laterally spaced rows of mutually facing cages. An inwardly inclined tray means is positioned above that portion of each lower cage immediately beneath an upper cage to collect and urge droppings caught thereon for deposit through the central spacing between the rows of the cages onto the collection surface. A scraper means automatically cleans the tray means intermittently. Droppings and the like which fall through the remaining portions of the upper cages and the entire lower level cages fall directly onto the collection surface.

The provision of an arrangement which combines pyramidal and vertical stacking of cages having a lower than normal profile permits a tri-level unit which can be completely serviced by an attendant from a single walk-way on each side while at the same time significantly reduces the overall floor space required. By off-setting each layer of cages laterally and vertically, the waste collecting apparatus does not require as large a spacing between the various levels so that the entire assembly is compact enough to provide significant savings.

DESCRIPTION OF THE DRAWINGS

FIG. 4 is a side elevation of the apparatus shown in FIG. 2;

FIG. 6 is an overhead plan view on a reduced scale of the collecting tray and scraper utilized in the invention.

DESCRIPTION OF THE PREFERRED EMBODIMENT

Figure 1:
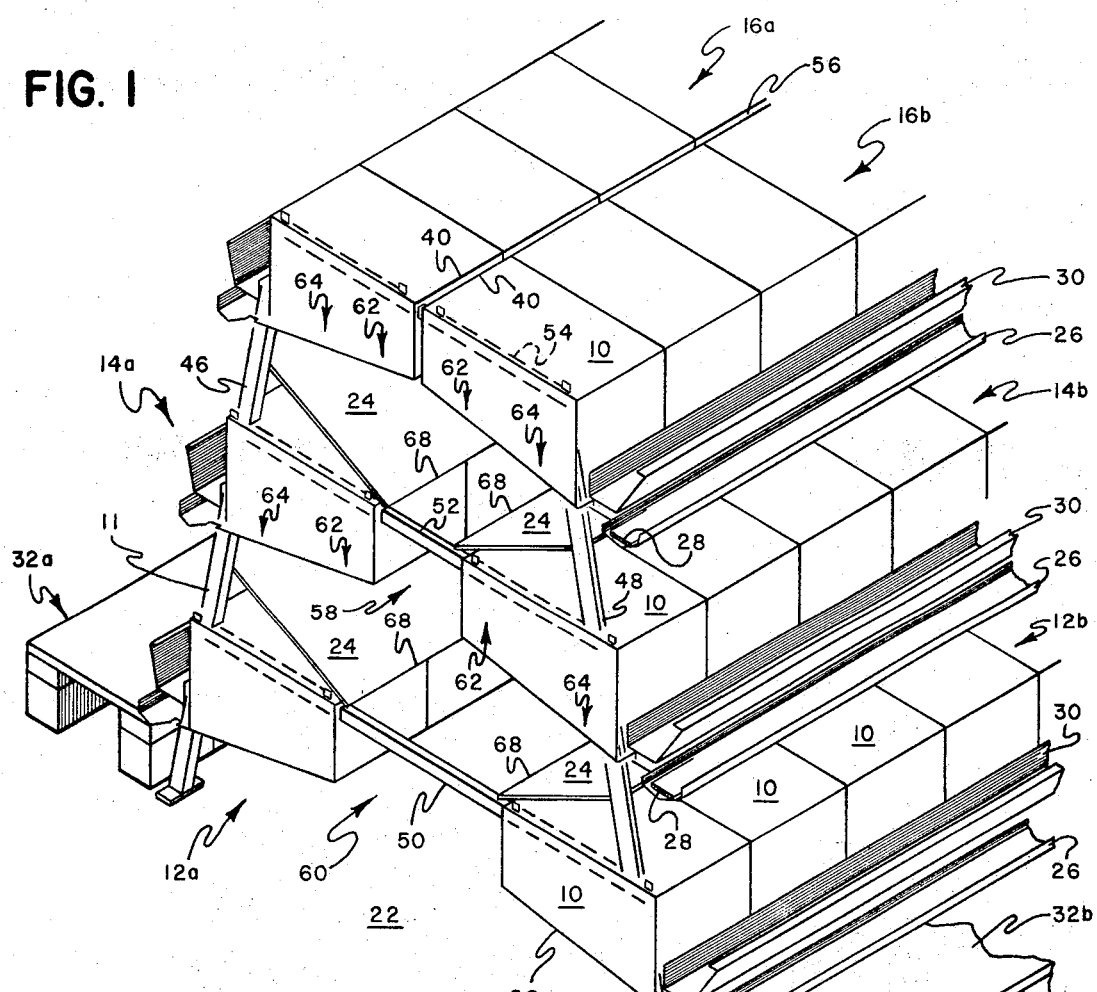
FIG. 1 is a fragmentary view in perspective of a multi-tier cage construction embodying the invention.

Referring now to the drawings, FIG. 1 illustrates a tri-deck arrangement comprising a plurality of poultry confinement cages 10 attached to a support frame 11 and arranged in three tiers 12, 14, 16. Each tier includes a pair of longitudinally extending rows of side-by-side cages with each row being spaced back-to-back with respect to the other row. Thus, lower tier 12 includes rows 12a and 12b; middle tier 14 includes rows 14a and 14b; and top row 16 includes rows 16a and 16b.

The cages 10 include a mesh bottom 20 which permits droppings and the like to fall through directly to a dung-collecting pit 22 or onto collecting trays 24 from when the collections are subsequently directed through the central openings between each row of cages for deposit in pit or collecting surface 22. The detail of these arrangements will be described in more detail hereinafter.

The bottoms 20 of cages 10 are inclined outwardly in the sense that eggs layed thereon are urged by gravity into an egg collecting tray 26, positioned along the outer peripheral sides of each cage. The bottom of tray 26 includes a conveyor belt 28 which operates intermittently to transfer the eggs to a central collection area without requiring any manual labor. The outsides of each cage include a feeding trough 30 and watering means (not shown) which automatically provides sufficient subsistence for the poultry. Each half of the cage structure is serviceable by an attendant from a single walk-way 32a or 32b.

Figure 5:
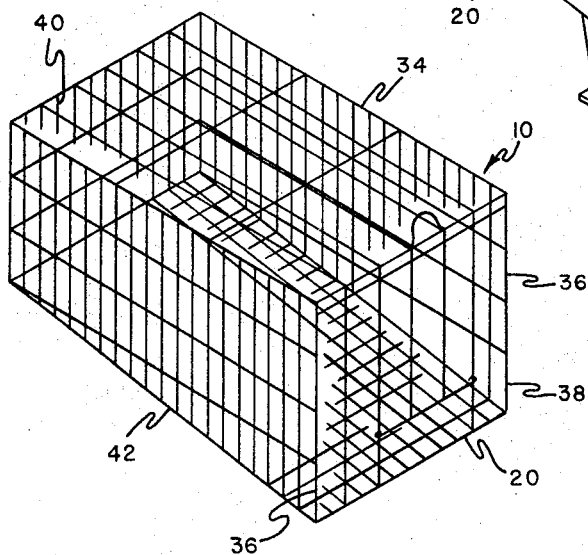
FIG. 5 is a perspective view of a low-profile cage provided by the invention.

Referring now in detail to FIG. 5, each cage 10 is conventional in that it includes a bottom panel 20, top panel 34, side panels 36 and front and rear end panels 38 and 40. The front panel is designated as such to connotate that end of the cage wherein the poultry confined therein are watered and fed and the eggs are collected. Except for side panels 36, each panel is rectangular. Bottom panel 20 as mentioned previously is inclined to gravitationally urge eggs layed thereon onto egg collection tray 26. As a result of the inclined orientation, side panels 36 are generally trapezoidal in shape with the lower terminal edge 42 being sloped to conform to the incline of bottom 20. Thus, back panel 40 has a reduced height relative to front panel 38 depending strictly on the magnitude of incline of bottom 20.

Except for top panel 34, the remaining panels are conventional in that the spacings between the mesh are sufficiently reduced to prevent poultry from extending their head and neck out of the cage. Portions of front panel 38 do permit this so that the poultry confined therein can extend their head and neck out to reach the feed and water trough. Top 34 however preferably includes wider relative spacings between the mesh wiring to permit poultry confined within the cage to extend their neck and head out of the cage. In this fashion, the overall profile of cages 10 can be reduced to the extent that at least portions of the cage are not high enough to permit adult poultry to stand upright in. This permits an overall lower profile of the multi-deck arrangement provided by the invention when the cages are stacked relatively one above the other. The top is also generally horizontal to permit horizontal support elements 50, 52 and 54 to be mounted to or adjacent the upper corner of cage 10. In this fashion, the cages are suspended instead of supported at the bottom. By suspending the cages, the bottom panels 20 are flexible instead of essentially rigid which has been found to reduce egg breakage as eggs roll down the inclined bottom. Also, horizontal supports provide an overall simpler and more economical structure.

In accordance with the state of the art today, it is generally recognized that normal poultry cage height should be 16 inches. This permits poultry confined within such a cage to stand upright for stretching etc. and has been found not to adversely affect their growth and production rate. Where necessary, cage heights of approximately 14 inches have proven to be livable although not necessarily recommended as the most desirable. These heights refer to the height of the rear panel, and it will be appreciated that the front panels are generally higher as a result of the inclined bottom. One difficulty with cages having a rear panel of 14 to 16 inches is that when such cages are utilized in a three-tiered arrangement, the overall height of the arrangement after considerations are given for waste collection etc. makes it extremely difficult to service the arrangement by an attendant from a single level.

In accordance with the invention, by providing a top 34 which permits the poultry confined therein to extend their head and neck between the mesh spacings, it is possible to utilize a cage having a rear panel extending but 12 inches in height without adversely affecting the growth and production of the birds confined therein. By utilizing a cage having such a low profile in combination with the unique stacking arrangement and dung-collecting means provided by the invention, a tri-deck arrangement is now possible which can be serviced from a single level. It will be appreciated that if multi-levels are necessary for servicing, the production costs generally exceed the savings and floor space obtained by stacking the cages.

Figure 2:
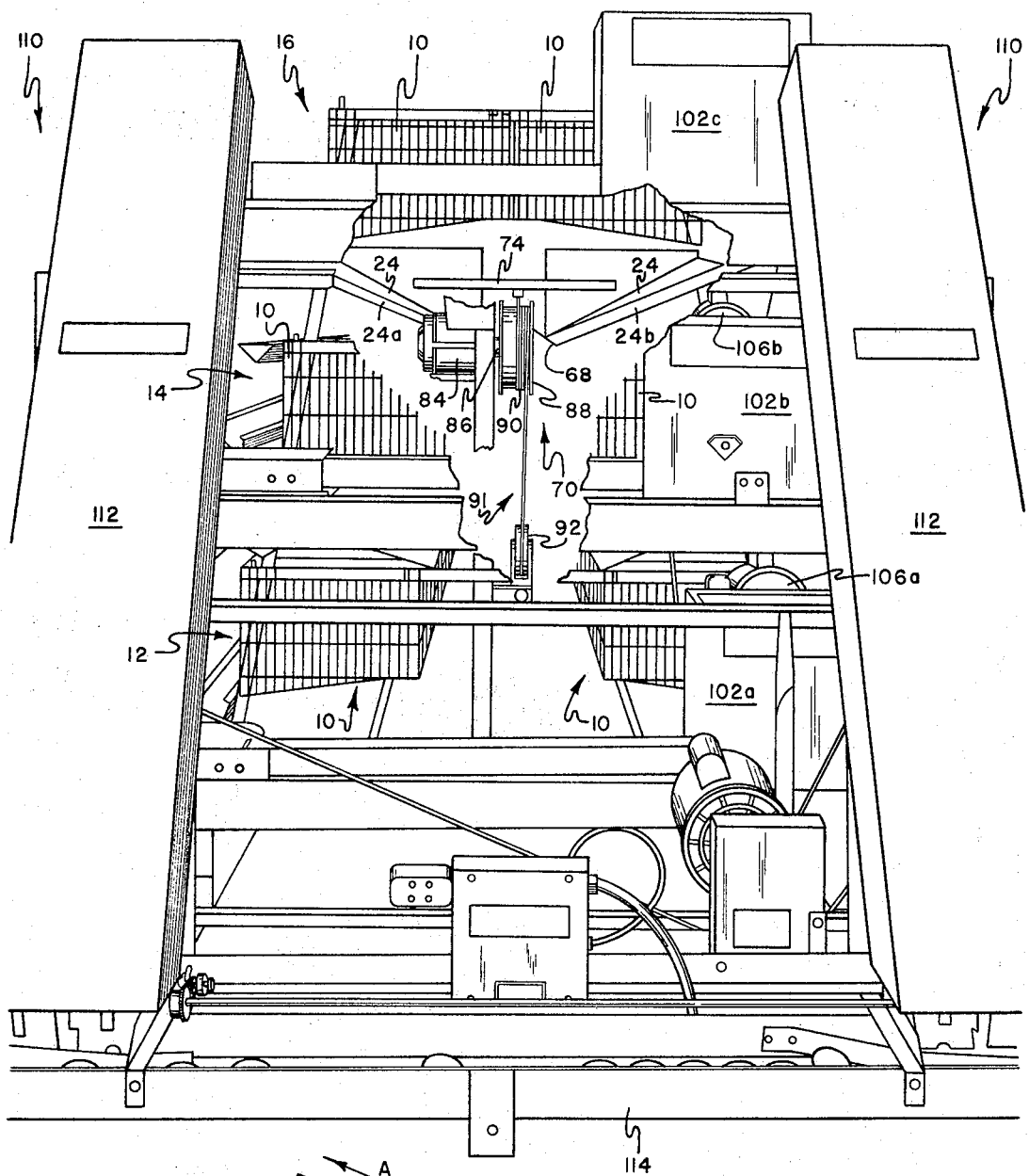
FIG. 2 is an end view of the structure shown in FIG. 1 with the addition of automated equipment cutaway to show the scraper mechanism provided by the invention.

Referring now back to FIG. 1 in detail, support frame 11 has an overall truncated A-frame configuration. A pair of generally upright support members 46 and 48 extend from the floor of pit 22 upwards at an incline converging toward each other. The uprights pass through the outer corner portion of each row of cages and are attached in a conventional manner. Horizontal cross supports 50, 52 and 54 rigidify the support structure and stabilize the various rows of cages. In addition they suspend the cages to reduce egg breakage by the manner described hereinbefore. The cross supports extend through the upper corner margin of cages 10 and are likewise attached thereto in a conventional fashion. A plurality of support structures 11 are spaced intermittently longitudinally along the arrangement to provide the requisite stability and rigidity of the entire structure. Referring additionally to FIG. 2, the incline of uprights 46 and 48 of suuport frame 11 is selected so that the top tier of cages comprised of rows 16a and 16b are in essentially a back-to-back abutting relationship with a minimal spacing 56 between end panels 40 of the cages comprising rows 16a and 16b. Since all of the cages comprising the tri-deck arrangement are identical, and they are attached to support frame 11 in identical fashion, the incline of uprights 46 and 48 establishes a pyramidal arrangement for tiers 12, 14 and 16. As a result, the cage rows of the lower tiers are spaced respectively further apart than the ones above it. Hence spacing 58 between rows 14a and 14b is larger than spacing 56 while spacing 60 between rows 12a and 12b is respectively larger than spacing 58 and 56.

As a result of the pyramid arrangement of tiers 12, 14 and 16, the innermost portion 62 of cages 10 in tier 16 are suspended directly above pit 22. That is, droppings or the like which fall through portions 62 of bottom 42 are free to fall directly into bit 22 through spacings 58 and 60. Likewise, the innermost portions 62 of the cages comprising tier 14 are also suspended directly over pit 22 in that droppings or the like which fall through portions 62 of the cages in tier 14 are free to fall directly into pit 22 through spacing 60. The entire portions of the cages comprising tier 12 are suspended directly over pit 22 so that all droppings falling through the lower tier cages fall directly into the pit. Thus, a substantial portion of the droppings which fall through all of the cages comprising the entire arrangement are free to fall directly into the collection pit 22. Indeed, in accordance with the invention, approximately two-thirds of the combined cage bottoms are exposed directly to pit 22. That is, the entire lower tier of cages are suspended directly over the pit while approximately one-half of the remaining cages is so arranged.

The remaining portions 64 of the cages comprising tiers 14 and 16 are suspended directly above the cages of the tier therebelow. As shown in FIG. 1, a generally longitudinally extending tray 24 is suspended beneath each cage portion 64 to prevent droppings from falling through portions 64 of the cage bottoms into a cage beneath it. Each tray 24 is inclined downwardly and inwardly so that droppings and the like collected on each tray will be urged into central spacings 58 and 60 so that they may fall directly into pit 22. The vertical spacing between tiers 12, 14 and 14, 16 is selected in accordance with the following factors. To begin with, since cages 10 have a lower than normal profile, there must be sufficient vertical spacing between each tier so that the birds confined within each cage have sufficient head room to extend their neck and head through tops 34 of the cages so that the birds can stand in an upright position. The second factor is the amount of vertical spacing required to suspend trays 24 beneath each cage section 64 to collect the droppings therefrom for deposit into pit 22.

Finally, in accordance with the overall features provided by the invention, the overall height of the tri-deck arrangement must be low enough so that it can be suitably serviced by an attendant from a single level. Each tier of course must be spaced enough vertically to permit each tray 24 to be completely suspended beneath cage portions 64 of tiers 14 and 16 for extension from each central opening 58 and 60 to the front edge of each cage. Thus, the inner margin 68 of each tray suspended beneath tier 16 is aligned with opening 58 while the inner margin 68 of each tray suspended beneath tier 14 is aligned with opening 60.

Figure 3:
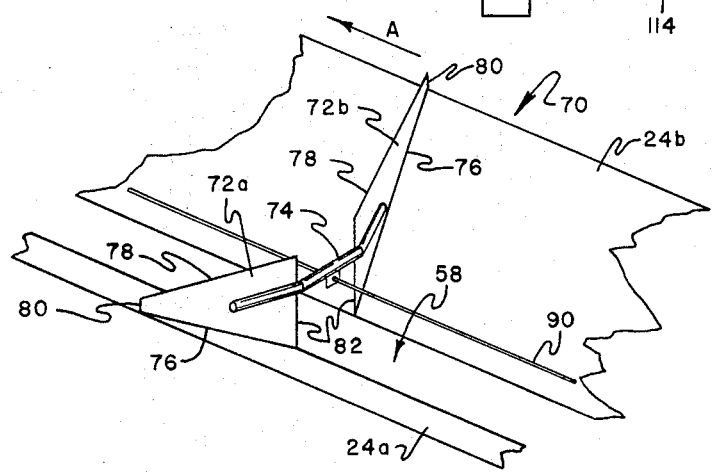
FIG. 3 is a fragmentary view in perspective of the scraper provided by the invention.

Referring now in detail to FIGS. 2, 3 and 6, a scraper assembly 70 is shown which operates to intermittently clean the deposit collected on trays 24 and deposit them through openings 58 and 60 so that they fall directly intp pit 22. Each pair of right and left handed trays suspended beneath a tier of cages include a left handed blade 72a and a right handed blade 72b each of which is engageable correspondingly with trays 24a and 24b. Each pair of blades 72a and 72b are interconnected by a rigid rod 74. The blades positioned beneath tier 16 function as scrapers when advancing from right to left in the direction of arrow A shown in FIGS. 3 and 6, while the blades associated with tier 14 function as scrapers when advancing from left to right in the direction of arrow B (FIG. 6). By reversing the directional movement of the blades, they are returned to the position shown in the drawings. They do not perform a scraping function during their return traverse of the trays.

Referring to FIG. 3, the scraping edge 76 of each blade is offset longitudinally ahead of the upper edges 78 so that the plane of each blade is inclined at an angle to the vertical with respect to each tray 24a and 24b. The outer ends 80 of each blade extend longitudinally in front of the inner ends 82 so that each blade is similar to what might be described as a snow plow to scrape, lift and direct the deposits formed on the trays inwardly for deposit through spacings 58 and 60 onto pit surface 22.

The drive mechanism for moving the blades includes a single cable 90 wound upon a cable driving drum 88 and movable through a drive train 91 via pulleys 92 (all of which are not shown). The cable is secured to each support rod 74 so that each scraper assembly can be pulled under tension in either direction. The drum 88 is conventionally mounted upon a drive shaft 86 which may be conventionally driven by a reversible motor 84. Rotation of drum 88 in one direction causes joint movement of the upper and lower scraper assembly under tension from one end to the other of trays 24, while rotation in the opposite direction causes reverse movement of the scrapers in the opposite direction.

Motor 84 can be operated in accordance with a timer so that an arbitrary number of cleaning passes are made each day. Appropriate sensing and tripping mechanisms (not shown) are positionable at each end of the tri-deck arrangement causing reversal of the direction of motor 84 when the scrapers reach the completion of one scraping pass. A trip mechanism at the other end is utilized to turn motor 84 off. In accordance with the foregoing, by arranging the various tiers in a partially stepped pyramidal relationship which positions portions of each cage above the pit and portions directly above the tier below it, it is possible to utilize a relatively simple dung-collecting apparatus without requiring the type of vertical spacing which would prevent servicing the entire tri-deck arrangement from a single level. This is possible since only portions of the upper cages require a dung-collection and removal apparatus.

Referring now in greater detail to FIGS. 2 and 4, appropriate automated equipment is shown for feeding the poultry confined within each cage and for automatically collecting the eggs produced by the poultry. As mentioned previously, the fronts of each cage extend exteriorly with respect to the tri-deck arrangement. The feeding, watering and egg collecting apparatus are all arranged at the front portion of each cage so that in effect, the various apparatus extend peripherally around the outside of the tri-deck arrangement.

Turning to FIG. 4, an automated feeding system 100 is shown which automatically supplies feed in troughs 30 for the poultry confined within the cages. Each tier 12, 14 and 16 includes an individual feed hopper 102a, 102b and 102c. Overhead supply conduits 104a, 104b and 14c respectively bring the feed from a central supply hopper into the individual hoppers so that there is sufficient feed for distribution to the individual cages at all times. Adjacent each hopper 102 is a power source in the form of a motor 106a, 106b and 106c which operates a conveyor chain disposed in the bottom of trough 30 which operates in a continuous cycle around the entire periphery of each tier to provide an adequate supply of feed at all times to the poultry. The motors are shown mounted on top of a feed return hopper 108a, 108b and 108c. The overall operation of this arrangement is well known and hence not described in great detail. The frame elements 109 are utilized to support the entire feeding arrangement 100. As shown in FIG. 4, portions of the front panel 38 of each cage do not include horizontal wiring so that the bird is free to extend its head and neck out of the front panel and bring it down into through 30 to feed properly.

Referring now to FIGS. 1, 2 and 4, the egg collection assembly 110 will be described briefly. Again, many of the aspect of the egg collection assembly are well known in the art and hence not described in detail. As noted earlier, the inclined bottoms 20 of the individual cages cause eggs layed thereon to roll by their gravitational weight to the front of the cage. An opening is provided to permit the egg to roll entirely out of the cage onto an egg collecting trough 26. Although trough 26 is shown as a separate structure from the cages, many conventional cages form the egg trough integrally with the cage bottom. A conveyor belt 28 is movably disposed in the bottom of each trough for advancing the eggs intermittently to a central collection point. Referring to FIG. 4, troughs 26 are interconnected to an egg transfer elevator 112 by a second trough 26a. Elevators 112 receive the eggs from troughs 26a and lower them appropriately to a central egg collecting conveyor 114 shown in FIG. 2. From here, the eggs are advanced to a central sorting and distribution point where they are graded, weighed, checked and boxed.

With reference to FIG. 1, it will be appreciated that each trough 26 on one side of the tri-deck arrangement is offset horizontally from the one below or above it. This means that eggs are introduced to elevators 112 at various horizontal displacements. As a result, each elevator 112 includes three compartments utilized as elevators for receiving the eggs from each separate tier. Elevators 112 are well known in the art and hence not described or shown in great detail. The egg collecting arrangement 110 and feeding arrangement 100 are described to the extent shown to illustrate the complete automation of the tri-deck arrangement and its utilization in regards to its particular distinct compactness.

The overall operation of large poultry raising installations are essentially automated as shown and described herein. However, it is still essential that manual inspection and assistance be utilized. Occasionally, some of the poultry in the cages die and they must be removed. On other occasions, a disease may be contacted necessitating the individual handling of each bird for medication purposes. For this reason, the novel tri-deck arrangement described herein can be completely serviced from a single walk-way 32a and 32b positioned adjacent lowered tier 12 on each exterior side of the tri-deck arrangement. Walk-ways 32a and 32b are shown slightly elevated with respect to the floor so that a pit 22 is provided for the collection of droppings and the like. It will be appreciated that in certain installations, pit 22 may actually be sunken below floor level in which case the walk ways become the floor itself opposed to an elevated platform. However, to make all three levels easily serviceable from level, the walk way is preferably positioned immediately adjacent the lower tier of cages.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

The embodiments of the invention in which an exclusive property or privilege is claimed are defined as follows.

1. A low profile tri-deck assembly comprising, in combination: a support frame positioned on a support surface; a pair of back-to-back row of cages in each deck, each upper row of cages being partially offset inwardly above the row beneath it, said assembly having a truncated A-shaped cross section; inclined shield means positioned beneath that portion of each upper row of cages positioned above the row therebeneath, said inclined shield means preventing droppings from falling from the upper cages directly into the lower cages, said inclined shield means directing the droppings inwardly for deposit on a collection surface, each of said cages having a horizontal top and inclined bottom, said bottom being inclined in a direction opposite that of said shield means above or beneath it, and a back panel, the back panel of each cage having a maximum height of less than 14 inches, at least a portion of each cage being of insufficient height to permit adult poultry confined therein to stand in a normal upright position, the tops of each cage being mesh-like and forming means defining openings which permit adult poultry confined therein to extend their head and neck through said openings to permit said poultry to stand upright in said cage portions, said decks being positioned vertically from each other a distance only great enough to permit said poultry to stand upright in said cages beneath said upper rows, all of said cages in said assembly being serviceable by an attendant from said support surface.

2. The tri-deck cage assembly according to claim 1 wherein said back panel has a height of approximately 12 inches.

3. The tri-deck cage assembly according to claim 1 wherein said support comprises a plurality of vertically spaced horizontal support members, each of said cages being suspended from one of said horizontal support members immediately adjacent the top of said cage.

4. The tri-deck cage assembly today to claim 1 wherein the assembly further includes means for automatically providing feed floor water for the poultry confined within said cages; means for automatically collecting eggs laid by poultry confined within said cages; and scraper means movable along said shield means to direct droppings collected thereon onto said collection surface.

* * * * *